UNITED STATES PATENT OFFICE.

ALEXANDER BERNSTEIN, OF BERLIN, GERMANY.

PEPTONIZED-MILK BEVERAGE.

SPECIFICATION forming part of Letters Patent No. 552,681, dated January 7, 1896.

Application filed December 13, 1894. Serial No. 531,656. (No specimens.)

*To all whom it may concern:*

Be it known that I, ALEXANDER BERNSTEIN, a subject of the Emperor of Germany, residing at Berlin, Germany, have invented new and useful improvements in the production of a new beverage from milk in which all the protein substance is converted into albumose and peptone, or what is generally called "peptonized," of which the following is a specification.

It is well known that ordinary milk is difficult of digestion by many adult persons, on account of the undissolved state of the casein.

The object of my invention is to render the casein easily digestible by dissolving it, so as to obtain a clear liquid more resembling wine than milk, and to further transform the milk-sugar naturally contained in this liquid into alcohol and carbonic acid.

In carrying out my invention, instead of employing chemical means for dissolving the casein, which would be very objectionable if the liquid is intended for drinking purposes, I make use of a bacterium.

The special bacterium which answers the purposes of my invention best is one which I have discovered and fully described in a paper read before the meeting of the British Association for the Advancement of Science on August 9, 1894, at Oxford, England. This new bacterium, which may be called "peptone bacterium," can be found in milk, and can be isolated by the well-known method of Robert Koch, when it may be easily recognized by the following peculiarities: It has the form of a very small rod, scarcely one one-thousandth millimeter long and half as wide. Two rods are generally seen together. It shows rapid whirling motion. The colonies on meat peptone gelatine are of a liquid, cloudy appearance and soon liquefy the gelatine entirely; on meat peptone agar-agar, a white, slimy growth is formed; on potatoes a smooth, brown skin. No spores can be observed by coloring.

In carrying out my invention I proceed as follows: A small quantity of milk, preferably separated milk (or buttermilk or whey may be used) is first completely sterilized and then a small quantity of the peptone bacteria, grown on agar, is added. In a few days the milk, if kept at from 20° to 30° Celsius, becomes more transparent and liquid without showing any signs of curdling. In this state it is added to a larger quantity of sterilized milk, and this method is carried on until the desired quantity of milk is under treatment. During the time of incubation the milk should be kept in slow motion by means of revolving blades. The action of the peptone bacteria has mainly the effect of changing the casein directly into albumose and peptone without previous precipitation of casein, and further of forming as by-products lactic acid and in very small quantities acetic and butyric acid and salts of ammonia. Such bacteria, which first precipitate the casein and then gradually dissolve the precipitate, do not produce a liquid best answering the purposes of a beverage. As soon as the lactic acid has reached twenty-three per cent. I interrupt the process of incubation. It is important for the success of the following operations that the proper amount of acidity should be obtained, and this point can be determined by taking samples of the milk and treating them with a known solution of sodium hydrate. The milk is now reheated, the peptone bacteria are thereby killed, and the casein which was not dissolved becomes curdled or coagulated, whereby a ready means is afforded of separating the dissolved parts from the undissolved by filtration.

The filtrate is a clear liquid of pleasant taste and aromatic smell and is easily digested. It does not contain any of the objectionable products of decomposition, which are always produced by those bacteria which first curdle the milk and then gradually dissolve the curd.

The clear liquid is poured into bottles in which it is to be kept and then again sterilized, when it will be ready for use.

During the action of the peptone bacteria it is best to exclude all other bacteria; but when the filtrate has been obtained it may be treated with other micro-organisms. It may then be made to undergo alcoholic fermentation by using yeast. Although ordinary yeast will not act on milk-sugar, such special yeasts have lately been found and described by Duclau, Weigmann, and others. I avail myself of such special yeast. As the treatment with yeast in this case does not differ from the alcoholic fermentation as ordinarily used, it requires no description.

The filtrate may be aerated or it may be improved in taste by the addition of other substances. If it is desired to obtain the peptone in dry form, this can be done by precipitating the dissolved peptone by means of alcohol.

Having now particularly described and ascertained the nature of my said invention and in what manner the same is to be performed, I declare that what I claim is—

1. The herein described process of producing a peptonized beverage from milk which consists in first sterilizing the milk, then treating the sterilized milk with peptone bacteria and then separating the dissolved from the undissolved portions by heating and filtration, substantially as described.

2. The herein described process of producing a peptonized beverage from milk which consists in first sterilizing the milk, then treating the sterilized milk with peptone bacteria, then separating the dissolved from the undissolved portions by heating and filtration, then producing alcoholic fermentation of the filtrate.

3. The herein described alcoholic beverage prepared solely from milk and containing only the constituents of the milk free from foreign substances, the casein of the said milk being present in said beverage in the form of peptones and albumose, substantially as described.

In witness whereof I, the said ALEXANDER BERNSTEIN, have hereunto set my hand this 30th day of November, 1894.

ALEXANDER BERNSTEIN.

Witnesses:
W. HAUPT,
C. KRIEGER.